United States Patent
Brugler et al.

(10) Patent No.: US 10,223,817 B2
(45) Date of Patent: *Mar. 5, 2019

(54) DISPLAYING COMPUTER DASHBOARD INFORMATION

(71) Applicant: INTERNATIONAL BUSINESS MACHINES CORPORATION, Armonk, NY (US)

(72) Inventors: Thomas S. Brugler, Fuquay-Varina, NC (US); Vincent C. Conzola, Raleigh, NC (US); Randall A. Craig, Raleigh, NC (US); Todd M. Eischeid, Cary, NC (US); Mark E. Molander, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 550 days.

This patent is subject to a terminal disclaimer.

(21) Appl. No.: 14/978,402

(22) Filed: Dec. 22, 2015

(65) Prior Publication Data

US 2016/0110897 A1 Apr. 21, 2016

Related U.S. Application Data

(63) Continuation of application No. 13/180,413, filed on Jul. 11, 2011, now Pat. No. 9,218,676.

(51) Int. Cl.
*G06F 3/048* (2013.01)
*G06T 11/20* (2006.01)
(Continued)

(52) U.S. Cl.
CPC ............ *G06T 11/206* (2013.01); *G06F 11/30* (2013.01); *G06F 11/3003* (2013.01);
(Continued)

(58) Field of Classification Search
CPC ...... G06F 11/30; G06F 11/3003; G06F 11/32; G06F 11/323; G06F 11/3055;
(Continued)

(56) References Cited

U.S. PATENT DOCUMENTS 5,251,152 A 10/1993 Notess
5,347,452 A * 9/1994 Bay, Jr. .................. G06Q 40/04
340/4.5

(Continued)

OTHER PUBLICATIONS

Computer User's Dictionary, fifth edition, © 2002; selected pages (Year: 2002).*

(Continued)

*Primary Examiner* — Ajay M Bhatia
*Assistant Examiner* — Jennifer E Nichols
(74) *Attorney, Agent, or Firm* — Griffiths & Seaton PLLC

(57) ABSTRACT

Exemplary method, system, and computer program product embodiments for displaying computer dashboard information are provided. In one embodiment, by way of example only, historical values associated with time intervals are displayed in a single gauge. The historical values are arranged in such a manner that at least one of the historical values is contrasted against a current value for comparison as a single metric. Additional system and computer program product embodiments are disclosed and provide related advantages.

17 Claims, 7 Drawing Sheets

Gauge showing range colors for Day, Week, Month and Year.

Gauge showing the current value just above the day's high-water mark.

(51) Int. Cl.
  *G06F 11/30* (2006.01)
  *G06F 11/32* (2006.01)
  *G06T 11/00* (2006.01)
  *G06F 1/3206* (2019.01)

(52) U.S. Cl.
  CPC ............ *G06F 11/32* (2013.01); *G06F 11/323* (2013.01); *G06F 11/324* (2013.01); *G06T 11/001* (2013.01); *G06F 1/3206* (2013.01); *G06F 11/3055* (2013.01); *G06F 11/3058* (2013.01); *G06F 11/3065* (2013.01); *G06F 11/3079* (2013.01); *G06F 11/3089* (2013.01); *G06F 2201/88* (2013.01)

(58) Field of Classification Search
  CPC ............ G06F 11/3079; G06F 11/3089; G06F 11/324; G06F 11/3065; G06F 11/3058; G06F 1/3206; G06F 2201/88; G06T 11/206; G06T 11/001
  See application file for complete search history.

(56) References Cited

U.S. PATENT DOCUMENTS

| | | | |
|---|---|---|---|
| 5,553,235 A | 9/1996 | Chen et al. | |
| 5,936,622 A | 8/1999 | Halverson et al. | |
| 6,128,016 A | 10/2000 | Coelho et al. | |
| 6,211,873 B1 | 4/2001 | Moyer | |
| 6,826,675 B1* | 11/2004 | Tormey | G06F 7/785 712/202 |
| 6,900,808 B2 | 5/2005 | Lassiter et al. | |
| 6,901,560 B1 | 5/2005 | Guerlain et al. | |
| 6,952,808 B1* | 10/2005 | Jamieson | G05B 19/409 715/764 |
| 7,023,440 B1 | 4/2006 | Havekost et al. | |
| 7,171,628 B1* | 1/2007 | Perttunen | G06F 8/61 715/853 |
| 7,219,034 B2 | 5/2007 | McGee et al. | |
| 7,343,563 B2 | 3/2008 | Muratori et al. | |
| 7,348,981 B1* | 3/2008 | Buck | G06Q 30/06 345/440 |
| 7,376,904 B2 | 5/2008 | Cifra et al. | |
| 7,558,754 B1 | 7/2009 | Singer et al. | |
| 7,636,643 B1* | 12/2009 | Circenis | G01D 13/02 702/130 |
| 7,703,034 B2 | 4/2010 | Kornerup et al. | |
| 7,779,368 B2 | 8/2010 | Wichelman et al. | |
| 7,783,928 B2 | 8/2010 | Abrashkevich et al. | |
| 7,957,932 B1 | 6/2011 | Antanies | |
| 8,269,620 B2 | 9/2012 | Bullemer et al. | |
| 8,364,519 B1 | 1/2013 | Basu et al. | |
| 8,579,814 B2 | 11/2013 | Fotiades et al. | |
| 9,218,676 B2* | 12/2015 | Brugler | G06T 11/206 |
| 2002/0026404 A1* | 2/2002 | Thompson | G06Q 40/04 705/37 |
| 2002/0194114 A1* | 12/2002 | Erdmier | G06Q 40/00 705/37 |
| 2003/0055863 A1 | 5/2003 | Spiegel et al. | |
| 2003/0112269 A1* | 6/2003 | Lentz | G06F 9/451 715/738 |
| 2005/0169436 A1 | 8/2005 | Balkman | |
| 2006/0236248 A1 | 10/2006 | Eischeid et al. | |
| 2007/0038543 A1* | 2/2007 | Weinstein | G06Q 20/027 705/36 R |
| 2007/0174174 A1 | 7/2007 | Brucato | |
| 2007/0176933 A1* | 8/2007 | Culpi | G06T 11/206 345/440.2 |
| 2007/0192723 A1 | 8/2007 | Anzelde et al. | |
| 2007/0226617 A1 | 9/2007 | Traub et al. | |
| 2008/0162210 A1 | 7/2008 | Gu et al. | |
| 2008/0310608 A1 | 12/2008 | Johnson et al. | |
| 2009/0132457 A1 | 5/2009 | Brandenburg et al. | |
| 2009/0183101 A1* | 7/2009 | Brugler | G06F 3/048 715/771 |
| 2010/0039433 A1* | 2/2010 | McGreevy | G05B 23/0267 345/473 |
| 2010/0079488 A1* | 4/2010 | McGreevy | G06F 17/30572 345/629 |
| 2010/0332923 A1 | 12/2010 | D'Abreu et al. | |
| 2011/0061013 A1 | 3/2011 | Bilicki et al. | |
| 2011/0214081 A1 | 9/2011 | Dobrin et al. | |
| 2012/0078574 A1* | 3/2012 | Slates | G05B 23/0272 702/179 |
| 2012/0246589 A1 | 9/2012 | Wernecke | |
| 2017/0067751 A1* | 3/2017 | Apley | G01W 1/00 |

OTHER PUBLICATIONS

"IEEE Guide for the Application of Human Factors Engineering in the Design of Computer-Based Monitoring and Control Displays for Nuclear Power Generating Stations," IEEE Std 1289-1998, 45 pages.

Brown et al., "Color and Sound in Algorithm Animation," Aug. 30, 1991, 32 pages.

Muller et al., "Visualization Methods for Time-Dependent Data—An Overview," Proceedings of the 2003 Winter Simulation Conference, 9 pages.

* cited by examiner

Gauge showing current network traffic.

Gauge showing background range color.

Guage showing the current value in a colorrange.
(e.g., Indicated by speckled, single lines)

Gauge showing range colors for Day, Week, Month and Year.

Gauge showing the current value just above the day's high-water mark.

Gauge showing the current value approaching the Month and Year's high.

High-water marks indicationg exception for the year.

High-water marks indicating recent high activity.

Warning threshold hit for Month's high-water mark.

Critical alert sent when day's high-water mark exceeded.

DISPLAYING COMPUTER DASHBOARD INFORMATION

CROSS REFERENCE TO RELATED APPLICATIONS

This application is a Continuation of U.S. patent application Ser. No. 13/180,413, filed on Jul. 11, 2011.

BACKGROUND OF THE INVENTION

Field of the Invention

The present invention relates generally to computers, and more particularly, to displaying computer dashboard information in a computing storage environment.

Description of the Related Art

In today's society, computer systems are commonplace. Computer systems may be found in the workplace, at home, or at school. Within these operating environments, computers serve a valuable and useful purpose in assisting with storing, analyzing, and monitoring data and business processes. In recent years, both software and hardware technologies have experienced amazing advancement to accomplish and enhance these operations and functionality. Many businesses employ one or more business applications of the computing system, and in some cases, suites of business applications, to provide visibility and control over various aspects of the business. To maximize the utility of a business application, users need to have visibility into the business processes managed by the business application, to monitor the health (e.g., the efficiency, operational status) of various business processes, and of the enterprise itself.

One of the most noticeable changes introduced by recent computer technology is the inclusion of computer generated dashboards to enhance the capabilities of computers and provide visibility and control over various aspects of the business. Business applications, however, typically are more focused on managing the business processes (for example, acquiring, generating and processing business data) than on providing immediate visibility into the health of those business processes.

SUMMARY OF THE DESCRIBED EMBODIMENTS

Within a computer generated dashboard, a gauge may be included as a practical tool to provide visibility into a business process and/or application. However, these gauges provide little context to aid the operator in interpreting the value of a given reading within the gauge. As a result, efficiency and productivity may be reduced.

Accordingly, and in view of the foregoing, various exemplary method, system, and computer program product embodiments for displaying computer dashboard information are provided. In one embodiment, by way of example only, a method comprises monitoring a current value for a parameter of interest of incoming data; automatically tracking a plurality of range sizes for maximum values associated with each one of a plurality of time intervals associated with at least one of a plurality of historical values, the plurality of time intervals representing time intervals for a day, a week, a month, and a year; displaying in a single gauge of a computing dashboard the maximum values from the at least one of the plurality of historical values associated with each one of the plurality of time intervals and incorporating the maximum values for each one of the plurality of time intervals into a background range of colors that are configured to change in the single gauge; contrasting the current value against each one of the maximum values in the single gauge for each one of the plurality of time intervals; arranging and displaying in the single gauge the maximum values associated with each one of the plurality of time intervals into the background range of colors in such a manner that the maximum values from the least one of the plurality of time intervals are contrasted against the current value for comparison as a single metric; and detecting if the current value is greater than each one of the maximum values for the plurality of time intervals, wherein: if the current value is greater than each one of the maximum values for each one of the plurality of time intervals, setting at least one of the maximum values as the current value, the at least one of the plurality of historical values updated periodically, and sending a notification that the current value has been exceeded, and if the current value is not greater than the each one of the maximum values for each one of the plurality of time intervals, displaying in the single gauge at least one of the maximum values associated with one of the plurality of time intervals contrasted against the current value for comparison.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

As previously mentioned, one of the most noticeable changes introduced by recent compute technology is the inclusion of computer generated dashboards to enhance the capabilities of computers. An ever-increasing number of industries rely on the human operator to monitor computer generated dashboards, to assess the health of a variety of systems. A dashboard may be an executive information system user interface that (similar to an automobile's dashboard) is designed to be easy to read. Within a computer generated dashboard, a gauge may be included to display the values of data. For example, a designer of a dashboard may choose between speed dominator gauges, progress bars, or bar charts to display key system within a gauge. Though these gauges provide an effective means to display current values, they do present a problem for the novice operator. Namely, these gauges provide very little context to aid the operator in interpreting the value of a given reading. For instance, the novice operator may have no idea whether a gauge displaying 153 MB/s is a typical value for a particular system or whether the value is a cause for alarm. In many gauges, background colors have been added to aid the operator in interpreting the current reading. However, one problem inherent with simply displaying color ranges is that the width of the ranges are static and never changing. In other words, what may have been a warning state yesterday may not be valid today. Also, being static, the range color fails to take into account seasonal trends.

In contrast, and to address the deficiencies previously described, the mechanisms of the illustrated embodiments serve to improve efficiency and productivity by allowing the operator to distinguish and discern how a current reading within a dashboard compares to both recent and past values. In one embodiment, computer generated dashboards include a single gauge for incorporating and adjusting background range colors to various high-water marks. The mechanisms seek to address the limitation of static background colors, by incorporating dynamic historical high-water marks into the background range color by retaining and displaying current values against the high-water marks for the day, week, month, and year. High-water marks may be a visual indication of the historical maximum value and/or historical minimum value of some given metric. By adding the additional visual reference data, the operator may distinguish and analyze how the current reading compares against both recent and past high-level marks.

In an alternative embodiment, by way of example only, maximum values associated with time intervals are displayed in a gauge (e.g., a single gauge). The maximum values are arranged in such a manner that at least one of the maximum values is contrasted against a current value for comparison as a single metric.

Figure 1:
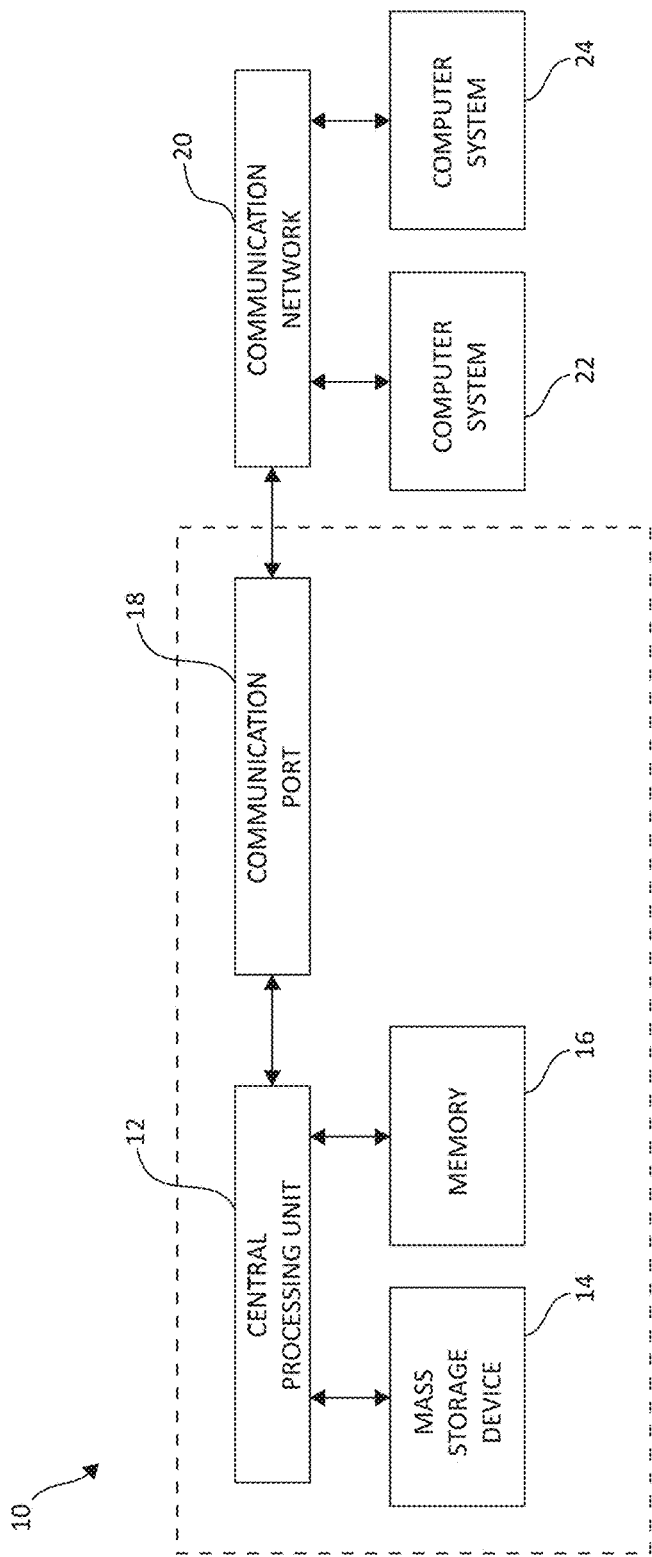
FIG. 1 illustrates a computer storage environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices 14 may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
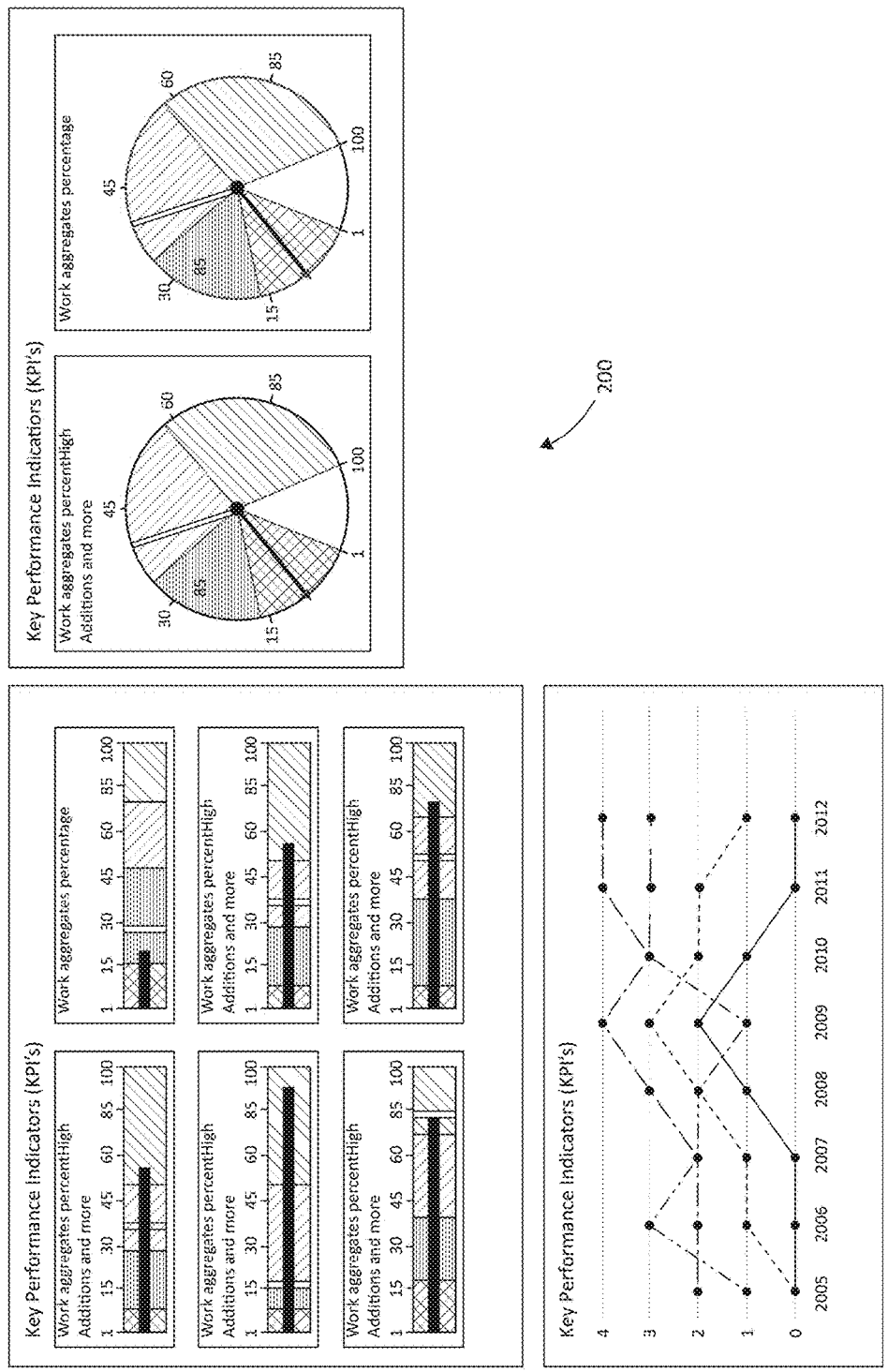
FIG. 2 illustrates an exemplary block diagram showing a computer generated dashboard.

FIG. 2 illustrates an exemplary block diagram 200 showing a computer generated dashboard. Within a dashboard, a designer may choose between speed dominator gauges, progress bars, or bar charts to display key system values within the dashboard. Like a car's dashboard (or control panel), a software dashboard may provide decision makers with the input necessary to "drive" the business. Thus, a graphical user interface may be designed to display summaries, graphics (e.g., bar charts, pie charts, bullet graphs, "sparklines," etc.), and gauges (with colors similar to traffic lights) in a portal-like framework to highlight important information. Digital dashboards may be laid out to track the flows inherent in the business processes that they monitor. Graphically, end users may see the high-level processes and then drill down into low level data. To gauge exactly how well an organization is performing overall, digital dashboards allow for capturing and reporting specific data points from each department within the organization, thus providing a "snapshot" of performance. As illustrated in the FIG. 2, a snapshot of performance is depicted for Key performance indicators (KPI) with speed dominator gauges, progress bars, and/or bar charts to display key system values.

Figure 3:
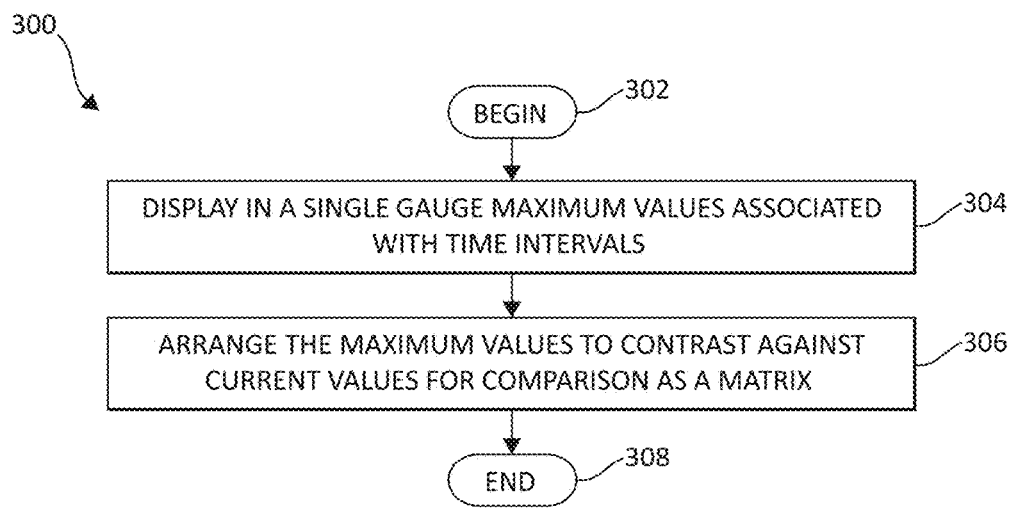
FIG. 3 is a flowchart illustrating an exemplary method for displaying computer dashboard information in which aspects of the present invention may be realized.

FIG. 3 is a flowchart illustrating an exemplary method 300 for displaying computer dashboard information in which aspects of the present invention may be realized in accordance with one embodiment. The method 300 begins (step 302), by displaying in a single gauge the maximum values (or other historical values such as minimum values) associated with time intervals (step 304). The maximum values are arranged to contrast against current values for comparison as a matrix (step 306). The method 300 ends (step 308).

In one embodiment, the mechanisms of the present invention are directed towards having the system automatically track and display range sizes for the high-water marks (e.g., maximum and/or minimum values) for a day, a week, a month, and/or year within the computer generated dashboard. The mechanisms constantly monitor incoming data (e.g., for a parameter of interest) and contrast a current value(s) against each of the four high-water marks. If the current value (e.g., the parameter of interest) is less than each (or less than one) of the four high-water marks no changes will be made. However, if the value is greater than each (or just one) of the four high-water marks, the mechanism may replace one or more of the high-water marks with the new value. To make the gauge more readable, the range high-water marks may update themselves on a periodic basis (e.g., 15 minutes) thereby being less obtrusive than both the current value and range size changing at a high frequency (e.g., 1 second interval).

Figure 4:
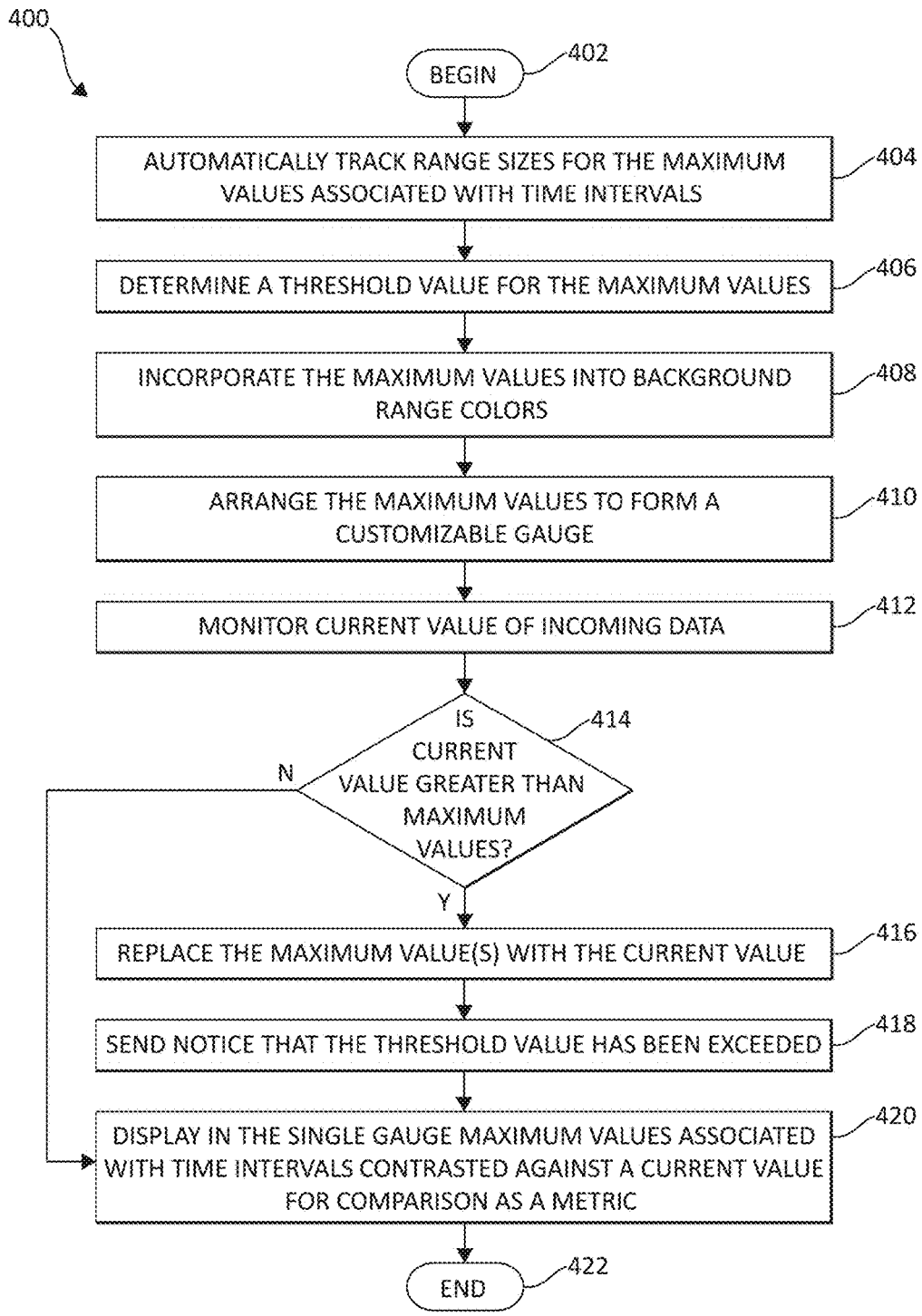
FIG. 4 is a flowchart illustrating an exemplary method for displaying and arranging maximum values associated with time intervals for comparison against current values.

Turning to FIG. 4, FIG. 4 is a flowchart illustrating an exemplary method 400 for displaying and arranging maximum values associated with time intervals for comparison against current values in which aspects of the present invention may be realized. The method 400 begins (step 402) by automatically tracking range sizes for the maximum values associated with time intervals (step 404). The method 400 will determine a threshold value for the maximum values (step 406). The maximum values are incorporated into background range colors (step 408). The maximum values are arranged to form a customizable gauge (step 410). The method 400 will monitor incoming data for a current value (step 412). When the current value (e.g., parameter of interest) is detected and/or identified during the monitoring, the method 400 will determine if the current value is greater than the maximum values (step 414). If yes, the method 400 will replace the maximum value(s) with the current value (step 416). A notice may be sent (e.g., to the user) to indicate that the threshold value has been exceeded (step 418). If the current value is less than the maximum values, the maximum values remain and the method 400 will display in a single gauge the maximum values associated with time intervals contrasted against a current value for comparison as a metric (step 420). The method 400 ends (step 422).

In an alternative embodiment, the mechanisms of the present invention provide the operator with the ability to customize a gauge within the dashboard. For example, an operator may only be interested in viewing the ranges for a month and year. If so, the operator may elect to hide the ranges for a day and a week. The mechanisms would allow the operator to add and/or edit the default high-water marks. For example, instead of using a week, the operator may be more interested in having a rolling interval for the last 5 days.

Figure 5A:
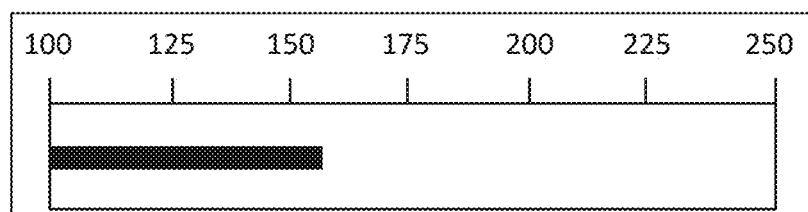
FIG. 5A illustrates an exemplary block diagram showing a gauge showing current network traffic.
Figure 5B:
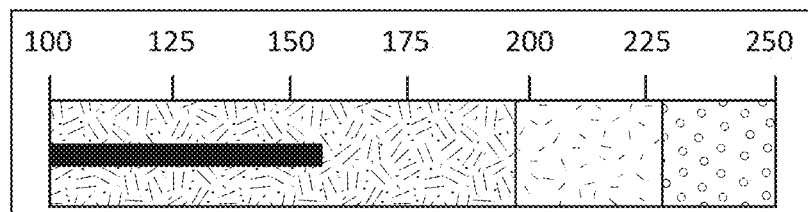
FIG. 5B illustrates an exemplary block diagram showing a gauge showing background range color.
Figure 5C:
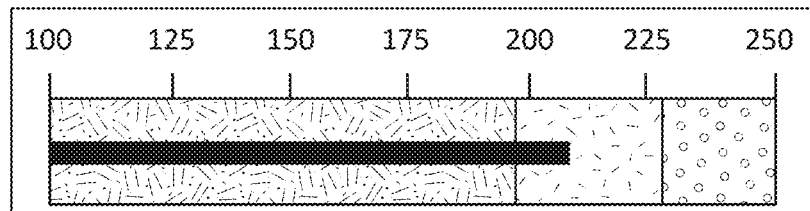
FIG. 5C illustrates an exemplary block diagram showing a gauge showing the current value in a color range.

Turning to FIG. 5A-5C, are several embodiments showing a computer generated dashboard with a gauge. FIG. 5A illustrates an exemplary block diagram 500 showing a gauge showing current network traffic. The current network traffic is displayed with arbitrary values of 100 up to 250. FIG. 5B illustrates an exemplary block diagram 510 illustrating a gauge showing a background range color. FIG. 5C illustrates an exemplary block diagram 520 showing a gauge showing the current value in a color range (e.g, illustrated in the diagram as a gauge showing the current value in a yellow range indicated by speckled, single lines). The color ranges may be varied and configured as needed.

Figure 6A:
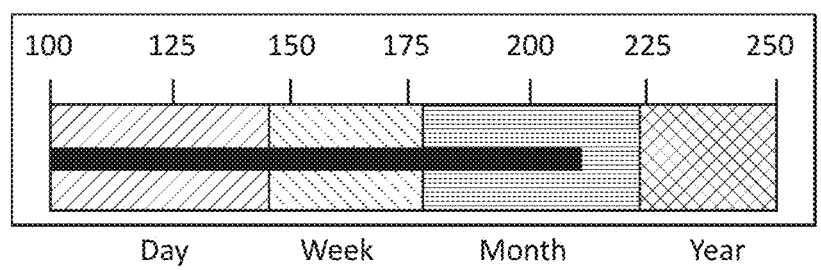
FIG. 6A illustrates an exemplary block diagram showing a gauge showing range colors for day, week, month, and year.

Turning to FIG. 6A-6G, the mechanisms illustrate several configured gauges displaying in a single gauge the maximum values associated with time intervals and arranged to contrast against current values for comparison as a metric(s). In each embodiment, by way of example only, a gauge is illustrated by displaying the values of data. Each gauge, includes a particular background color have been added to aid the operator in interpreting the current reading. However, these background colors are displaying color ranges of data that is static and changing. Thus, the operator responsible for monitoring the health of a system is constantly being displayed with real time data with warning state and/or alerts for todays values. Again, by way of example only, FIG. 6A-6G illustrates gauges that allow the operator to discern how a current reading within a dashboard compares to both recent and past values. These gauges, as illustrated below, incorporate and adjust background range colors to various high-water marks and retain and display values against the high-water marks for the day, week, month, and year. By adding the additional visual reference data, the operator may distinguish and analyze how the current reading compares against both recent and past high-level marks. For example, within each figure, an arbitrary value(s) (e.g., examples selected in each figure include the values of 100, 125, 150, 175, 200, 225, and 250) are assigned and labeled above a particular day, week, month, and time interval (Only in FIG. 6A is the day, week, month, and year labeled. However, it should be noted that FIG. 6B-6G may be interpreted to include a day, week, month, and year similarly labeled as in FIG. 6A). Moreover, the background color ranges are represented by a variety of shapes and patterns to distinguish each time interval and/or value from another time interval and/or valued. For example, in FIG. 6A, the day background color range is represented by forward slanting lines, the week represented by downward slanted dotted lines, the Month represented by horizontal lines, and the year represented with downward and upward slanting lines to form an "X" pattern. These patterns may be used interchangeably to represent similar or distinct background color ranges. It is important to note that the various patterns and shapes represent the background color range that may be incorporated and adjusted to the various high-water marks. Each high-water mark may be time stamped and recorded.

Each gauge includes these high water-marks (e.g., maximum and/or minimum values) associated with time intervals and arranged in such a manner that at least one of the maximum values is contrasted against a current value for comparison as a single metric. As illustrated in several of the figures, a line depicts the metric of comparison for the operator to observe. The particular time period for each figure is listed and the background colors are included for monitoring the health of the system.

FIG. 6A illustrates an exemplary block diagram 600 showing a gauge showing range colors for a day, week, month, and year. FIG. 6A illustrates a key component by having the mechanisms automatically track and display the range sizes for the high-water marks for day, week, month, and year. Moreover, as shown in FIG. 6A, a value of 223 indicates that that the value is a case for concern and alarm since it approaches both the month and year's high-water marks.

Figure 6B:
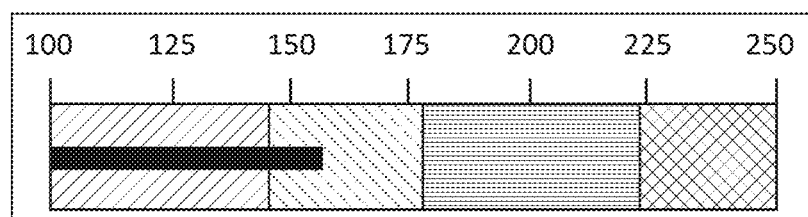
FIG. 6B illustrates an exemplary block diagram showing a gauge showing the current value just above the day's high-water mark.
Figure 6C:
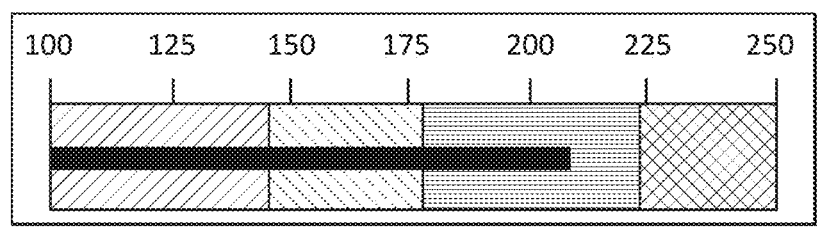
FIG. 6C illustrates an exemplary block diagram showing a gauge showing the current value approaching the month and year's high-water mark.

FIG. 6B illustrates an exemplary block diagram 610 showing a gauge showing the current value just above the day's high-water mark. As mentioned previously, by incorporating the high-water marks into the gauge, the operator may tell how the current reading stacks up against both recent and past high-level marks. As shown in FIG. 6B, the value of 155 is probably of little concern, since the value is slightly below the day's high-water mark. On the other hand, FIG. 6C illustrates an exemplary block diagram 620 showing a gauge showing the current value approaching the month and year's high. The value of 215 is nearing the month and year's high end, which may cause increased concern to the user who is monitoring the system.

Figure 6D:
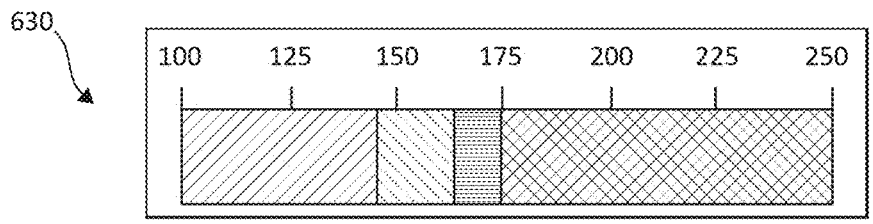
FIG. 6D illustrates an exemplary block diagram showing a gauge showing high-water marks indicating exception for the year.

In addition, not only may the high-water marks serve to provide background reference points to contrast current values, but also the relative range sizes may provide important information in and of themselves. For example, FIG. 6D illustrates an exemplary block diagram 630 showing a gauge showing high-water marks indicating exception for the year. The year's high-water mark appears to be an exception, since the rest of the high-water marks are relatively aligned in close proximity.

Figure 6E:
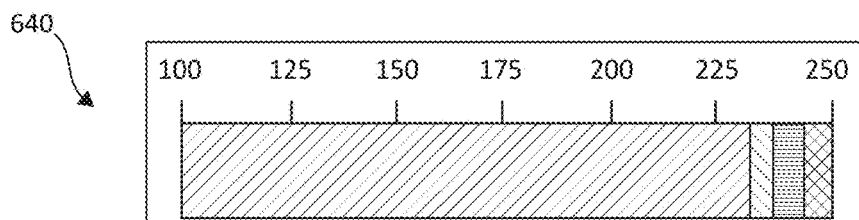
FIG. 6E illustrates an exemplary block diagram showing a gauge showing High-water marks indicating recent high activity.

However, as shown in FIG. 6E, FIG. 6E illustrates an exemplary block diagram 640 showing a gauge showing High-water marks indicating recent high activity. The mechanisms illustrate that the single gauge depicting a system under recent stress, as indicated by the fact that day, week, and months ranges are closely packed towards the year's high-water marks.

Figure 6F:
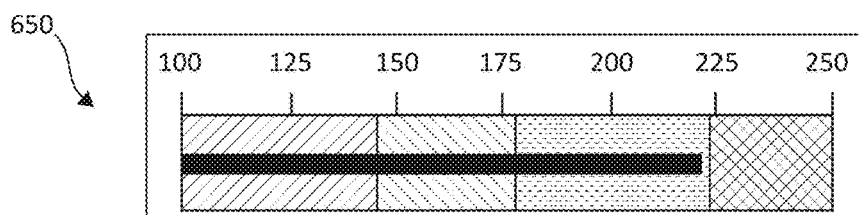
FIG. 6F illustrates an exemplary block diagram showing a gauge showing warning threshold hit for Month's high-water mark.

In one embodiment, the high-water marks levels may serve as dynamic threshold points. For example the operator may elect to set a threshold notification if the value is within the month's high-water marks, as depicted in FIG. 6F. FIG. 6F illustrates an exemplary block diagram 650 showing a gauge showing warning threshold hit for Month's high-water mark.

Figure 6G:
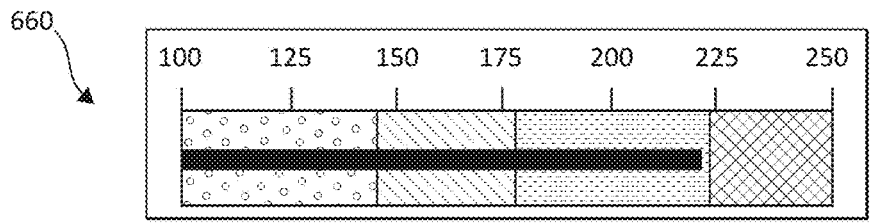
FIG. 6G illustrates an exemplary block diagram showing a gauge showing critical alert sent when day's high-water mark exceeded.

On the other hand, the operator may want to be notified of a critical alert, if the day's high-water mark is exceeded, as indicated in FIG. 6G. FIG. 6G illustrates an exemplary block diagram 660 showing a computer generated dashboard with a gauge showing critical alert sent when day's high-water mark exceeded. The dynamic thresholds may also be incorporated with fixed thresholds, which may be specified as fixed values (e.g., >156 MB/s) by the operator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for displaying computer dashboard information by a processor device in a computing environment, the method comprising:
    monitoring a current value for a parameter of interest of incoming data;
    automatically tracking a plurality of range sizes for maximum values associated with each one of a plurality of time intervals associated with at least one of a plurality of historical values, the plurality of time intervals representing time intervals for a day, a week, a month, and a year;

displaying, in a single gauge of a computing dashboard, the maximum values from the at least one of the plurality of historical values associated with each one of the plurality of time intervals and incorporating the maximum values for each one of the plurality of time intervals into a background range of colors that are configured to change in the single gauge; wherein a range size for a maximum value from the plurality of range sizes associated with each time intervals are arranged and integrated into the single gauge representing a single metric;

contrasting the current value against each one of the maximum values in the single gauge for each one of the plurality of time intervals; wherein the current value is superimposed on the single gauge; arranging, in the single gauge, the maximum values associated with each one of the plurality of time intervals into the background range of colors in such a manner that the maximum values from the least one of the plurality of time intervals are contrasted against the current value for comparison; and detecting if the current value is greater than each one of the maximum values for the plurality of time intervals, wherein:

if the current value is greater than each one of the maximum values for each one of the plurality of time intervals, setting at least one of the maximum values as the current value, the at least one of the plurality of historical values updated periodically, and sending a notification that the current value has been exceeded, and if the current value is not greater than the each one of the maximum values for each one of the plurality of time intervals, displaying in the single gauge at least one of the maximum values associated with one of the plurality of time intervals contrasted against the current value for comparison;

periodically updating the maximum values in the background range of colors in the single gauge less frequently as compared to the current value and the plurality of range sizes changing at a higher frequency.

2. The method of claim 1, further including stamping and recording each of the maximum values associated with each one of the plurality of time intervals.

3. The method of claim 1, further including configuring the at least one of the plurality of historical values to serve as one of a fixed and dynamic threshold, wherein a notification is sent upon one of the fixed and dynamic threshold being exceeded.

4. The method of claim 1, further including, incorporating the at least one of the plurality of historical values into a plurality of range colors.

5. The method of claim 1, further including, pursuant to the arranging, forming the single gauge that is customizable for the displaying.

6. The method of claim 1, wherein the plurality of historical values includes one of a maximum and a minimum value.

7. A system for displaying computer dashboard information in a computing storage environment, comprising:
a processor device operable in the computing storage environment, wherein processor device is adapted for:
monitoring a current value for a parameter of interest of incoming data;
automatically tracking a plurality of range sizes for maximum values associated with each one of a plurality of time intervals associated with at least one of a plurality of historical values, the plurality of time intervals representing time intervals for a day, a week, a month, and a year;

displaying, in a single gauge of a computing dashboard, the maximum values from the at least one of the plurality of historical values associated with each one of the plurality of time intervals and incorporating the maximum values for each one of the plurality of time intervals into a background range of colors that are configured to change in the single gauge; wherein a range size for a maximum value from the plurality of range sizes associated with each time intervals are arranged and integrated into the single gauge representing a single metric;

contrasting the current value against each one of the maximum values in the single gauge for each one of the plurality of time intervals; wherein the current value is superimposed on the single gauge; arranging, in the single gauge, the maximum values associated with each one of the plurality of time intervals into the background range of colors in such a manner that the maximum values from the least one of the plurality of time intervals are contrasted against the current value for comparison; and detecting if the current value is greater than each one of the maximum values for the plurality of time intervals, wherein:

if the current value is greater than each one of the maximum values for each one of the plurality of time intervals, setting at least one of the maximum values as the current value, the at least one of the plurality of historical values updated periodically, and sending a notification that the current value has been exceeded, and if the current value is not greater than the each one of the maximum values for each one of the plurality of time intervals, displaying in the single gauge at least one of the maximum values associated with one of the plurality of time intervals contrasted against the current value for comparison;

periodically updating the maximum values in the background range of colors in the single gauge less frequently as compared to the current value and the plurality of range sizes changing at a higher frequency.

8. The system of claim 7, wherein the processor device is further adapted for stamping and recording each of the maximum values associated with each one of the plurality of time intervals.

9. The system of claim 7, wherein the processor device is further adapted for configuring the at least one of the plurality of historical values to serve as one of a fixed and dynamic threshold, wherein a notification is sent upon one of the fixed and dynamic threshold being exceeded.

10. The system of claim 7, wherein the processor device is further adapted for incorporating the at least one of the plurality of historical values into a plurality of range colors.

11. The system of claim 7, wherein the processor device is further adapted for, pursuant to the arranging, forming the single gauge that is customizable for the displaying.

12. The system of claim 7, wherein the plurality of historical values includes one of a maximum and a minimum value.

13. A computer program product for displaying computer dashboard information in a computing environment by a processor device, the computer program product comprising a non-transitory computer-readable storage medium having computer-readable program code portions stored therein, the computer-readable program code portions comprising:

an executable portion for monitoring a current value for a parameter of interest of incoming data; an executable portion for automatically tracking a plurality of range sizes for maximum values associated with each one of a plurality of time intervals associated with at least one of a plurality of historical values, the plurality of time intervals representing time intervals for a day, a week, a month, and a year;

an executable portion for displaying, in a single gauge of a computing dashboard, maximum values from at least one of the plurality of historical values associated with each one of the plurality of time intervals and incorporating the maximum values for each one of the plurality of time intervals into a background range of colors that are configured to change in the single gauge; wherein a range size for a maximum value from the plurality of range sizes associated with each time intervals are arranged and integrated into the single gauge representing a single metric;

an executable portion for contrasting the current value against each one of the maximum values in the single gauge for each one of the plurality of time intervals; wherein the current value is superimposed on the single gauge;

an executable portion for arranging, in the single gauge, the maximum values associated with each one of the plurality of time intervals into the background range of colors in such a manner that the maximum values from the least one of the plurality of time intervals are contrasted against the current value for comparison; and an executable portion for detecting if the current value is greater than each one of the maximum values for the plurality of time intervals, wherein:

if the current value is greater than each one of the maximum values for each one of the plurality of time intervals, setting at least one of the maximum values as the current value, the at least one of the plurality of historical values updated periodically, and sending a notification that the current value has been exceeded, and if the current value is not greater than the each one of the maximum values for each one of the plurality of time intervals, displaying in the single gauge at least one of the maximum values associated with one of the plurality of time intervals contrasted against the current value for comparison;

an executable portion for periodically updating the maximum values in the background range of colors in the single gauge less frequently as compared to the current value and the plurality of range sizes changing at a higher frequency.

14. The computer program product of claim 13, further including an executable portion for stamping and recording each of the maximum values associated with each one of the plurality of time intervals.

15. The computer program product of claim 13, further including an executable portion for performing at least one of:

configuring the at least one of the plurality of historical values to serve as one of a fixed and dynamic threshold, wherein a notification is sent upon one of the fixed and dynamic threshold being exceeded, and incorporating the at least one of the plurality of historical values into a plurality of range colors.

16. The computer program product of claim 13, further including, pursuant to the arranging, an executable portion for forming the single gauge that is customizable for the displaying.

17. The computer program product of claim 13, wherein the plurality of historical values includes one of a maximum and a minimum value.

\* \* \* \* \*